United States Patent [19]

Dobosi

[11] 3,886,327

[45] May 27, 1975

[54] CREDIT CARD

[76] Inventor: Laszlo J. Dobosi, 4317 Markwood La., Fairfax, Va. 22030

[22] Filed: Mar. 5, 1974

[21] Appl. No.: 448,416

[52] U.S. Cl. .......... 235/61.7 B; 35/35; 235/61.11 D; 360/2; 360/88; 360/105

[51] Int. Cl. ... G06k 7/08; G11b 5/54; G11b 21/22; G06k 19/00

[58] Field of Search.. 235/61.7 B, 61.11 R, 61.11 B, 235/61.1 D; 35/35; 178/5.1; 179/100.2; 340/149; 360/2, 105, 75, 88; 346/74 MP

[56] References Cited

UNITED STATES PATENTS

| | | | |
|---|---|---|---|
| 2,548,011 | 4/1951 | Frost | 35/35 |
| 2,849,542 | 8/1958 | MacChesney | 179/100.2 |
| 3,343,281 | 9/1967 | Greer | 35/35 |
| 3,416,241 | 12/1968 | Weitzner | 35/35 |
| 3,513,298 | 5/1970 | Riddle | 235/61.11 D |
| 3,629,556 | 12/1971 | Orzechowski | 235/61.11 B |
| 3,657,521 | 4/1972 | Constable | 235/61.7 B |
| 3,712,973 | 1/1973 | Karl | 235/61.11 R |
| 3,752,904 | 8/1973 | Waterbury | 178/5.1 |

*Primary Examiner*—Daryl W. Cook
*Assistant Examiner*—Robert M. Kilgore

[57] ABSTRACT

A credit card utilization system. A plurality of credit cards are provided. Each credit card bears an elongate strip of sound recording material including a recorded code word known only to the owner of the card. A plurality of card reading devices for reproducing the code word recorded on said strip are also provided. The card reading devices each include a housing, an inlet slot in a first wall of the housing for receiving a credit card to be read, an outlet slot in a second wall of the housing for discharging a credit card, rotatable wheels within the housing and positioned such that, on rotation of the wheels, the card is transported in a straight path through the housing. The card reading device also includes sound reproducing means for reproducing the code word recorded on the strip which includes a sound reproducing head moveably mounted within the housing and moveable between a first position in which the head is spaced from the straight path and a second position in which the head is in sound reproducing association with the strip for reproducing the recorded code word. A trigger member in the device is actuated by motion of the card along the straight path and moves the sound reproducing head from the first position to the second position for reproducing the code word recorded on the strip. The device also includes listening means to permit an operator of the device to listen to the reproduced code word for comparison with a code word given orally by the card owner.

1 Claim, 4 Drawing Figures

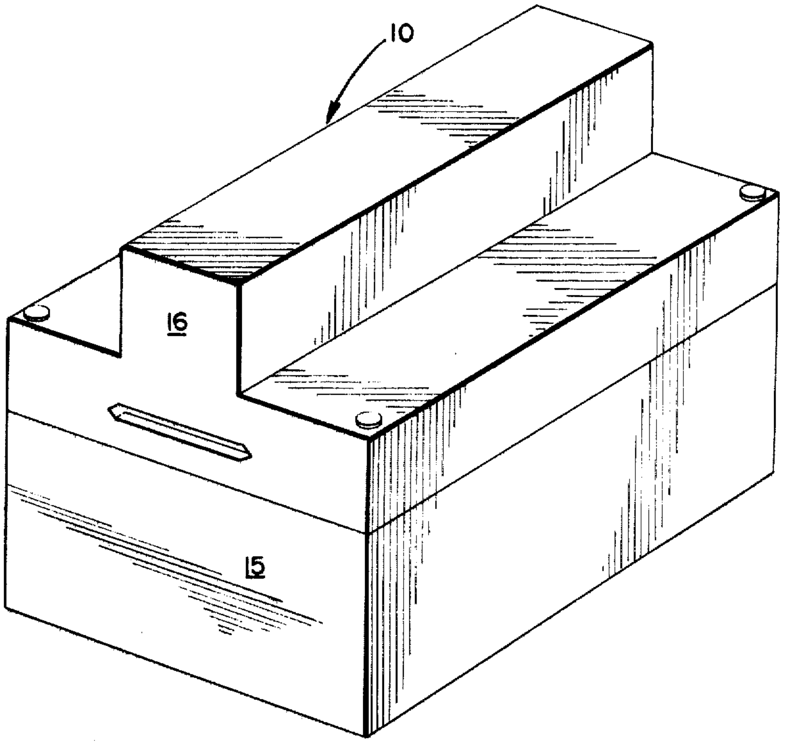
fig. 1
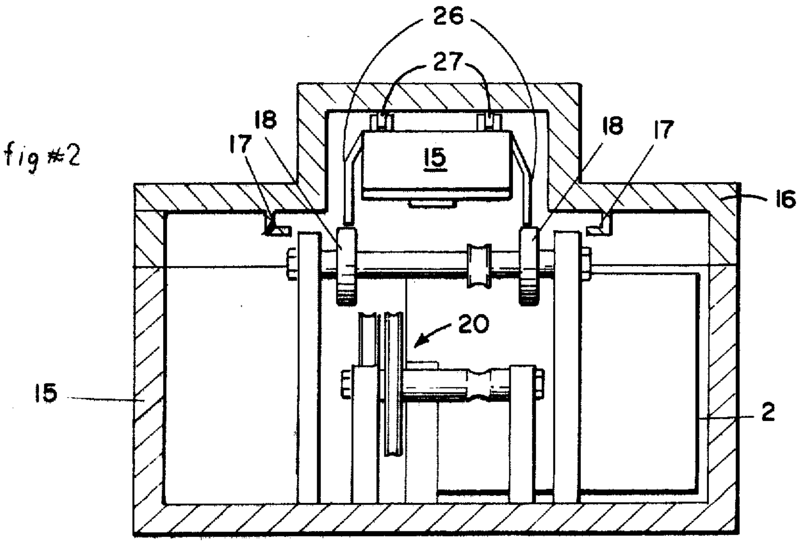
fig #2 fig #3
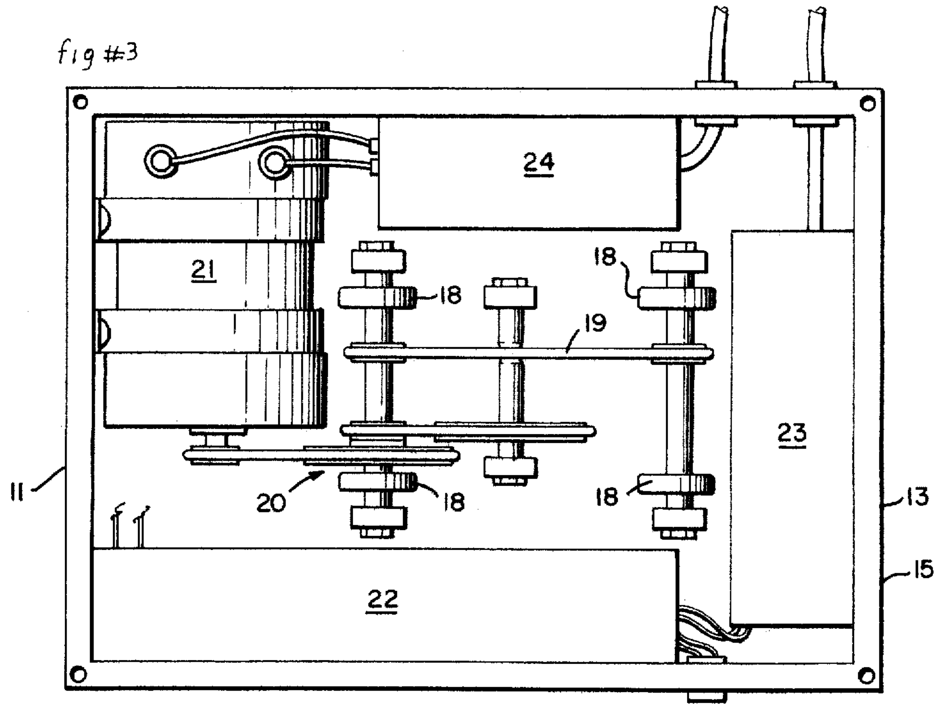
fig #4
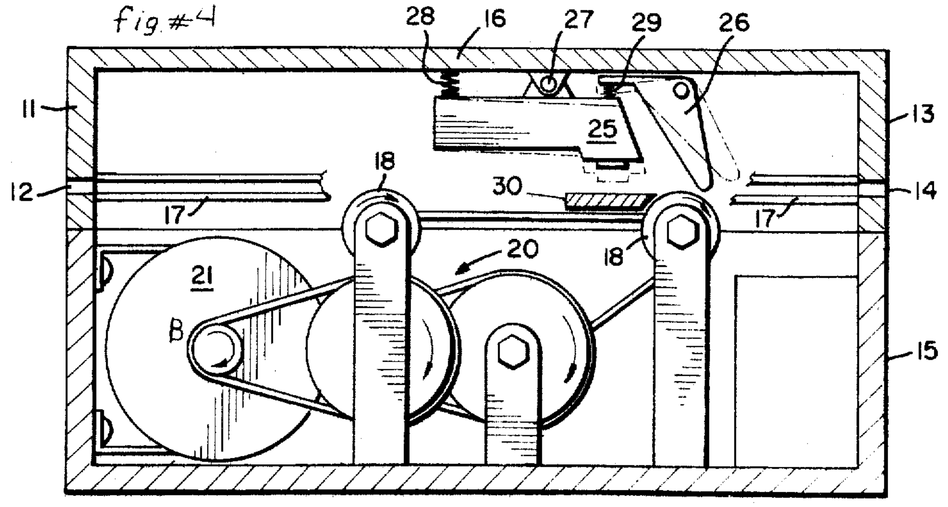

CREDIT CARD

BACKGROUND OF THE INVENTION

This invention relates to credit cards and, in particular, to anti-theft credit cards.

While anti-theft credit cards are known, there exists a need for improved systems and particularly in simple and reliable systems.

It is an object of the invention to provide a simple and reliable anti-theft credit card system.

BRIEF SUMMARY OF THE INVENTION

The foregoing and other objects which will be apparent to those having ordinary skill in the art are achieved according to the present invention by providing a credit card utilization system including a plurality of credit cards, each credit card bearing an elongate strip of sound recording material, the strip being disposed lengthwise of the credit card and including a recorded code word known only to the owner of the card, and a plurality of card reading devices for reproducing the code word recorded on the strip, the card reading devices each comprising a housing, an inlet slot in a first wall of the housing for receiving a credit card to be read, an outlet slot in a second wall of the housing for discharging a credit card from the card reading device, rotatable wheels within the housing and positioned such that a card introduced into the device is supported on the periphery thereof such that, on rotation of the wheels, the card is transported in a straight path through the housing from the inlet slot to the outlet slot, means for rotating the wheels, sound reproducing means adjacent the straight path for reproducing the code word recorded on the strip and comprising a sound reproducing head moveably mounted within the housing and moveable between a first position in which the head is spaced from a card in the straight path and a second position in which the head is in sound reproducing association with the strip on a card in the straight path for reproducing the recorded code word, a trigger member actuated by motion of the card in the straight path for moving the sound reproducing head from the first position to the second position for reproducing the code word recorded on the strip, means for biasing the head into the first position, and listening means to permit an operator of the device to listen to the reproduced code word for comparison with a code word given orally by the card owner.

The card is utilized by being passed through the device. The operator compares the reproduced code word with a code word given orally to the operator by the card owner.

DETAILED DESCRIPTION

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

FIG. 1 is a perspective view of a credit card reading device according to the invention;

FIG. 2 is an end view of the device of FIG. 1 with the top portion of the exterior housing removed;

FIG. 3 is a top view of the device of FIG. 1 with the exterior housing in section;

FIG. 4 is a side elevation view of the device of FIG. 1 with the exterior housing in section.

With reference to FIG. 4, a card reading device according to the invention includes an exterior plastic box housing 10, measuring 5 7/16 inches long, 4 inches wide, and 3 3/16 inches high. One end 11 of box 10 is provided with a card inlet slot 12 large enough to admit standard credit cards in current use. The other end 13 of box 10 is provided with a card outlet slot 14.

In the lower portion 15 of housing 10 are provided card guide members 17, card advancing wheels 18 driven by belt 19 driven through reduction gearing 20 by 6 volt motor 21, a transistorized sound reproducing amplifier 22 with accompanying power supply 23 and wiring, and a transformer 24 for low voltage motor 21.

In the upper portion 16 of housing 10 are provided a sound reproducing head 25 and trigger members 26. Sound reproducing head 25 is pivotably mounted on hinges 27 and is held in a first, basic, position by means of a spring 28 so as to be out of the straight path followed by a credit card on passing through the device from inlet slot 12 to outlet slot 13. Trigger member 26 is also biased in a clockwise direction in the sense of FIG. 4 by means of spring 29. A rigid support member 30 (see FIG. 4) integral with housing 10, is provided beneath sound responding head 25 to provide a bearing surface during reproduction of a code word recorded on a credit card.

A credit card is provided with a non-removable elongate strip of sound reproducing material such as used in a phonograph record for high fidelity sound. A code word known only to the card owner is recorded on the strip of recording material. The code word could be, for example, a commonly used English language word such as "apple", "blue", "fifty", "crowd" or the middle name of the card owner where the middle name is not written on the card. Upon presentation of the card to a retailer for purchase, the retail sales agent would ask the person tendering the card for the code word or ask the middle name, depending on the particular system adopted. The sales agent would then insert the card into entry slot 12 and energize motor 21 to cause the card to pass at a pre-determined linear speed through the device. The device can be provided with any convenient transducer, such as a telephone type listening device, to permit the sales agent to compare the recorded code word to that given orally by the user. Preferably, the listening device would permit discrete listening by the sales agent only.

What is claimed is:

1. A credit card utilization system comprising a plurality of credit cards, each credit card bearing an elongate strip of sound recording material, said strip being disposed lengthwise of the credit card and including a recorded code word known only to the owner of the card, and a plurality of card reading devices for reproducing the code word recorded on said strip, said card reading devices each comprising a housing, an inlet slot in a first wall of the housing for receiving a credit card to be read, an outlet slot in a second wall of the housing for discharging a credit card from said card reading device, rotatable wheels within said housing and positioned such that a card introduced into said device is supported on the periphery thereof such that, on rotation of said wheels, said card is transported in a straight path through said housing from said inlet slot to said outlet slot, means for rotating said wheels, sound reproducing means located adjacent said straight path for reproducing the code word recorded on said strip and comprising a sound reproducing head moveably mounted within said housing and moveable between a first position in which the head is spaced from a card in said straight path and a second position in which the head is in sound reproducing association with said strip on a card in said straight path for reproducing said recorded code word, a trigger member actuated by motion of said card in said straight path for moving said sound reproducing head from said first position to said second position for reproducing the code word recorded on said strip, means for biasing said head into said first position, and listening means to permit an operator of the device to listen to the reproduced code word for comparison with a code word given orally by the card owner.

* * * * *